Aug. 27, 1957 J. G. BERRY ET AL 2,804,134
SHEET MATERIAL SLITTING MACHINE
Filed Feb. 1, 1954 2 Sheets-Sheet 1
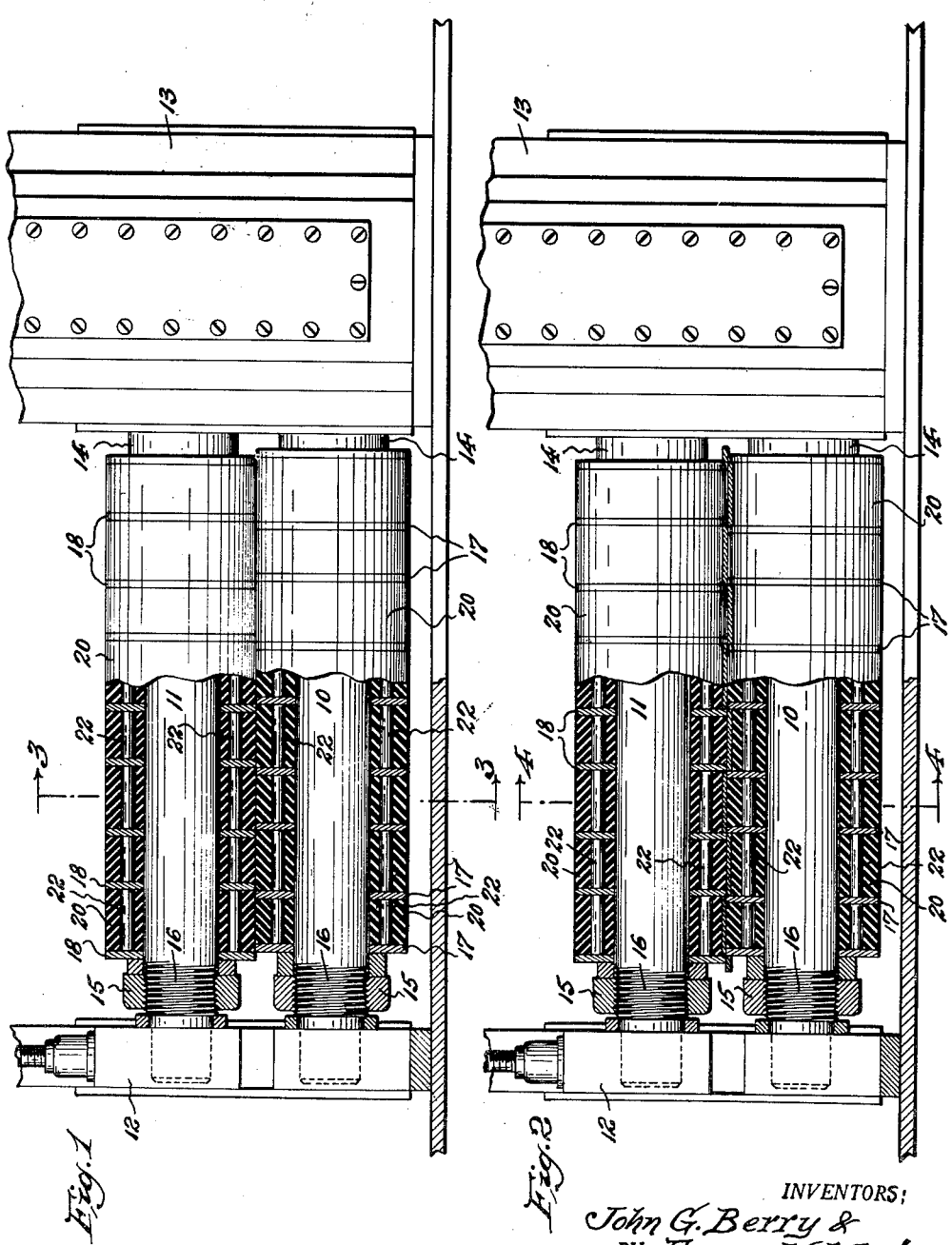
INVENTORS:
John G. Berry &
BY Eugene V. Mort,
George D. Richards
Attorney Aug. 27, 1957  J. G. BERRY ET AL  2,804,134
SHEET MATERIAL SLITTING MACHINE
Filed Feb. 1, 1954  2 Sheets-Sheet 2

INVENTORS:
John G. Berry &
BY Eugene V. Mort,
George L. Richards
Attorney

United States Patent Office 2,804,134
Patented Aug. 27, 1957

2,804,134

SHEET MATERIAL SLITTING MACHINE

John G. Berry and Eugene V. Mort, Short Hills, N. J.

Application February 1, 1954, Serial No. 407,386

5 Claims. (Cl. 164—60)

This invention relates to improvements in sheet material slitting machines of the type comprising top and bottom shafts upon which cooperative rotary cutter disks or knives are mounted in spaced apart relation according to widths of strips to be produced.

As heretofore known to the art, slitting machines of the above mentioned type, and especially slitting machines designed for operation upon sheet steel and other sheet metal, require considerable expenditure of time and labor in the preparatory operations of setting the cutter disks or knives thereof on their respective supporting shafts in spaced relation according to widths of strips to be produced, and in preparing and installing work supporting and stripping fingers or blocks in cooperative relation to the spaced cutter disks or knives. Such preparatory operations require that shaft supporting bearing means at one end of the machine be removed to expose shaft ends, so that the cutter disks or knives can be withdrawn from the shafts, and then reassembled thereon, pair by pair, together with spacer devices for separating the same according to widths of strips to be produced. After the cutter disks or knives are thus reassembled on the shafts, the removed shaft supporting bearing means must be replaced, and then separate work supporting bottom fingers or blocks and work stripping top fingers or blocks have to be prepared and mounted for fixed extension between the top and bottom shafts and intermediate the spaced apart pairs of cutter disks or knives; all of which operations are laborious and time consuming, and keep the machine out of service for long non-productive periods, so that its productive capacity is substantially reduced. The separate work supporting and stripping fingers or blocks are subject to rapid wear, and consequently require frequent replacement, and, furthermore, abrasion and roughening thereof during use involves risk of undesirably marring the surface of the sheet material undergoing the slitting operations.

Another inadequacy of heretofore known slitting machines, having conventional types of cutters, cutter spacing devices and stripping fingers, is the fact that, in operation thereof, especially when operating upon sheet metal, the material is not so supported contiguous to the lines of cut as to avoid formation of undesirable burrs along slit edges of produced strips.

Having the above in view, it is an object of this invention to provide novel means whereby the preparatory operations of setting up a slitting machine for use can be accomplished expeditiously with minimum expenditure of labor, and without necessity for removing cutter shaft supporting bearings, for removing the cutter disks or knives from their supporting shafts, or otherwise dismantling the machine, and without necessity for providing and mounting separate work supporting and stripping fingers or blocks; the means to this end comprising elements operative to combine the functions of spacing the cutter disks or knives on their supporting shafts and of providing work supporting and stripping means cooperative with the cutter disks or knives.

Another object of this invention is to provide a combined cutter disk spacing and work control means of such character that the material operated upon is supported contiguous to and between the lines of cut, in such manner as to prevent formation of undesirable burrs along the slit edges of strips produced by the slitting operation; and, to such end, to provide the cutter disk spacing and work control means in the form of annular, radially compressible, bodies of elastic material, said bodies corresponding in diameter to the diameters of the cutter disks, between which they are interposed, so that the circumferential surfaces thereof are in normal parallelly aligned relation to the peripheries of cutter disks in uninterrupted extension therebetween.

The invention has for a further object to provide a combined cutter disk spacing and work control means comprising a discontinuous annular body of elastic material, such as rubber, having imbedded therein, to extend from face to face thereof, rigid spacer members; said body being adapted to be temporarily spread open by separation of its meeting ends, whereby to straddle and pass over a cutter disk supporting shaft into place between cutter disks to be spaced apart thereby; and said body substantially conforming in diameter to the diameter of cutter disks to be spaced thereby.

The above and other objects will be understood from a reading of the following detailed description of this invention in connection with the accompanying drawings, in which:

Fig. 1 is an elevational view in part longitudinal section of a slitting machine according to this invention; and Fig. 2 is a similar view showing sheet material undergoing the slitting operation thereof.

Similar characters of reference are employed in the above described views, to indicate corresponding parts.

Figure 3:
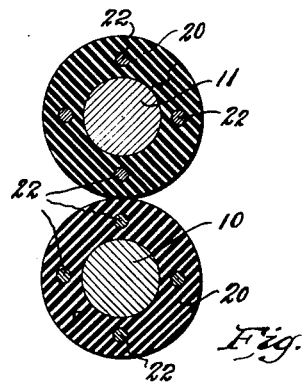
Fig. 3 is a vertical cross-sectional view, taken on line 3—3 in Fig. 1.
Figure 4:
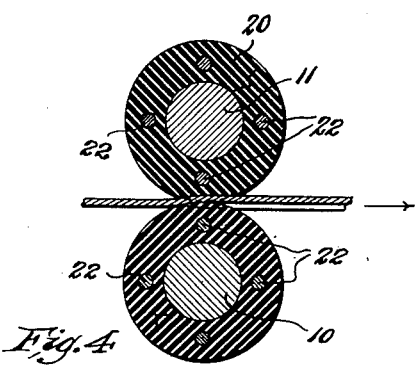
Fig. 4 is a similar vertical cross-sectional view, taken on line 4—4 in Fig. 2.

Referring to the drawings, the reference character 10 indicates the bottom cutter shaft and 11 the top cutter shaft of a slitting machine, said shafts being supported at their ends by bearing standards 12 and 13, in parallel spaced relation one to the other. As is usual in slitting machines, provision is made for adjusting the top cutter shaft toward the bottom cutter shaft, whereby to adjust upper and lower cutter disks, which are mounted on said respective shafts, in proper cooperative relation for producing slitting cuts through sheet material passed therebetween.

Mounted on each shaft is a gang of assembled cutter disks spaced apart by intermediate spacing means according to the width of strips into which the sheet material operated upon is to be slit. The gang of cutter disks and spacing means are clamped together in operative assembled relation upon the supporting shaft between a stop collar 14 fixed on one end portion of said shaft and a clamping nut 15 which is screwed onto a screw-threaded section 16 with which the opposite end portion of said shaft is provided.

Mounted on the bottom cutter shaft 10 are lower cutter disks 17, and mounted on the top cutter shaft 11 are upper cutter disks 18 which respectively cooperate with respective lower cutter disks. In arranging the upper and lower cutter disks to provide cooperative pairs thereof, first and second upper cutter disks are relatively disposed so that their opposed inner faces are spaced apart a distance corresponding to the width of strip to be produced, with the edges thereof coincident to said inner faces serving as their cutting edges. To cooperate with the thus arranged first and second upper cutter disks, first and second lower cutter disks are relatively disposed so that their non-opposed or outer faces are aligned in the planes of the opposed inner faces of said first and second upper cutter disks, with the edges coincident to the non-opposed or outer faces of said lower cutter disks serving as their cutting edges. As thus arranged, the cutting edges of cooperative upper and lower cutter disks function in shearing relation. Such arrangement required, on the one hand, provision of spacing means intermediate the first and second upper cutter disks, the width of which corresponds to the width of the strip to be produced, and, on the other hand, provision of spacing means intermediate the first and second lower cutter disks, the width of which is reduced by an amount equal to twice the thickness of a cutter disk. This arrangement of adjacent upper and lower cutter disks is successively alternated throughout the gangs or assemblies thereof on the cutter shafts, as will be understood by reference to Figs. 1 and 2 of the drawings.

According to this invention, a novel means is provided for spacing apart the cutter disks whereby to slit sheet material into strips of desired width; said means not only serving such spacing function but also, by virtue of the form and character thereof, eliminating necessity for provision of separate work supporting and work stripping fingers or blocks as heretofore required in slitting machines of the type to which this invention applies, since the spacing means of this invention is adapted to both support the sheet material and to strip the same from the cutter disks during the slitting operation.

In one form of the combined spacer and work supporting and stripping means according to this invention, as shown in Figs. 1 to 6 inclusive, the same comprises an annular body 20 made of elastic material, such as natural or synthetic rubber or equivalent compressibly resilient material. The central opening 21 of said body 20 is diametrically sized to conform to the external diameters of the cutter shafts 10 and 11, and said body 20 substantially corresponds in overall or outside diameter to the diameters of the cutter disks 17 and 18. The width of the body 20 is selectively dimensioned to substantially correspond to the spacing of the cooperative cutter disks as required for production of strips of selected width into which the sheet material operated upon is to be slit. Imbedded in the body 20, between its internal and external diameters, to extend from face to face thereof, are a plurality of circumferentially spaced precisely ground rigid spacer pins or bars 22, preferably of steel or like hard wear-resistant material. As thus disposed said spacer pins or bars 22 lie parallel to the axis of the body 20, and the same are of length accurately corresponding to required spacing distance by which given cutter disks are to be separated by the interposed body 20.

Figure 5:
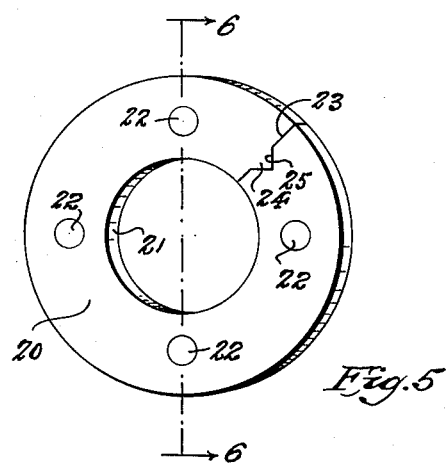
Fig. 5 is a perspective view of a combined cutter disk spacing and work control means according to this invention.
Figure 6:
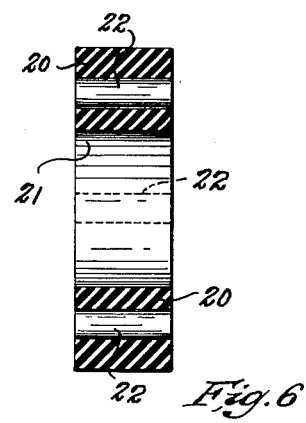
Fig. 6 is a vertical cross-sectional view thereof taken on line 6—6 in Fig. 5.
Figures 8, 9:
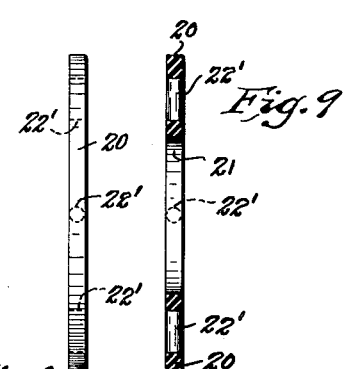
Fig. 8 is an edge elevational view of the same.
Fig. 9 is a vertical cross-sectional view thereof, taken on line 9—9 in Fig. 7.

The body 20 is discontinuous, being divided by a transverse cut 23 whereby to provide separable meeting ends, preferably suitably shaped to interlock when closed together, and, for such purpose, one said end is provided with a male coupling means 24 engageable with a female coupling means 25 with which the opposed end is provided (see Figs. 5 and 8). The spacer body 20, in a preferred form thereof, being discontinuous and being made of elastic material, is capable of being opened up by separation of its meeting ends, whereby it can be straddled and be passed over a cutter shaft for interposition between cutter disks to be spaced thereby. By reason of this, it is not necessary to remove shaft bearing support to free cutter shaft ends, nor is it necessary to withdraw the cutter disks from the cutter shafts. All that is necessary is to back off the clamping nuts 15, whereupon the cutter disks can be slid apart and the spacer bodies 20 of required dimension can be introduced between the cutter disks, whereafter the clamping nuts 15 can be screwed home to clamp the cutter disks and interposed spacer bodies together in operative assembled relation. It will therefore be obvious that a great saving of time and labor is attained both in initially setting up the slitting machine and in changing over the same according to width of strip desired to be produced.

Figure 7:
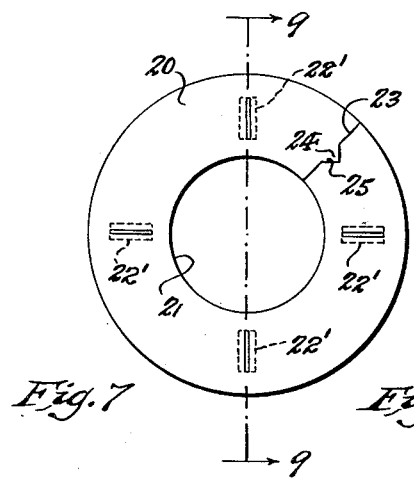
Fig. 7 is a face view of a modified form of the combined cutter disk spacing and work control means according to this invention.

When the spacer bodies 20 with their contained spacer pins or bars 22 are in place between adjacent cutter disks, and the assembly is clamped together, the opposite ends of the spacer bodies and their contained spacer pins or bars 22 will respectively abut the opposed faces of adjacent cutter disks, whereby to strongly brace and hold said cutter disks against displacement from operative spaced apart condition as predetermined by selected spacer bodies in use (see Figs. 1 and 2).

Where the cutter disk separating width of the spacer bodies is such as to space the cutter disks for producing comparatively wide strips, the disposition of the spacer pins or bars 22 relative to the bodies 20 is preferably that in which the former extend parallel to the axis of the latter, as above described and as shown in Figs. 1 to 6 inclusive. Where, however, the cutter disk separating width of the spacer bodies is such as to space the cutter disks for producing comparatively narrow strips, the disposition of the spacer pins or bars relative to the bodies is preferably that in which the former extend perpendicularly to the axis of the latter, whereby the diameters rather than the lengths of the spacer pins or bars determine their spacing effect. This is shown in Figs. 7 to 9 inclusive, wherein the spacer pins or bars 22' are so disposed, with their diameters extending between opposite faces of the body 20.

In a slitting machine having its cutter disks spaced by the novel spacer means according to this invention, due to the fact that the external diameters of the spacer bodies 20 correspond to the diameters of the cutter disks, peripheries of the spacer bodies on the bottom cutter shaft 10 are normally tangent to the peripheries of the spacer bodies on the top cutter shaft 11 (see Figs. 1 and 3), and due to the further fact that the spacer bodies 20 are resiliently compressible, when sheet material to be slit is passed between lower and upper cutter disks and their spacer bodies, the latter will yield radially to the passage of the sheet material and the strips slit therefrom (see Figs. 2 and 4), and therefore the spacer bodies constantly maintain contact with the work.

Due to the above stated form of resilient spacer bodies 20, and their relation to the cutter disks intermediate which they extend in end abutting relation thereto, so that their circumferential surfaces are in normal parallelly aligned relation to and between the cutting edges of said cutter disks, when the material operated upon, especially sheet metal material, is passed through the machine, said material, by reason of its thickness, radially compresses the elastic spacer bodies 20 conformably to the exact thickness of said material, thus supporting the material both top and bottom throughout the width of the strips to be produced. Such exact relationship and entire strip widthwise support can not be obtained where ordinary stripper fingers are employed, or where the material support is not contiguous to the cutting edges of the cutter disks, and coextensive with the width of the strips to be produced. When strips are slit by machines having conventional cutter disk spacers and stripping fingers, burrs along edges of the produced strips will alternately appear on the top side of one strip and on the bottom side of adjacent strips, for the reason that the material is not supported contiguous to the cutting edges of the cutter disks, and thus adjacent to points of thrust exerted by the peripheries of said cutter disks. Under such conditions, the wider spaced cutter disks on the top cutter shaft will exert downward pressure on unsupported marginal portions of the produced strip, so that the slit edges of the strip will be downwardly burred on the bottom or under side thereof, while the wider spaced cutter disks on the bottom cutter shaft will exert upward pressure on the unsupported marginal portions of adjacent strips, so that the slit edges of the latter will be upwardly burred on the upper or top sides thereof. When, however, the radially compressible elastic spacer bodies of this invention are employed, such burring of slit edges of the produced strips will not occur, since the sheet material is firmly supported closely contiguous to the lines of cut, both against unbacked down thrust of the wider spaced upper cutter disks and against unbacked up thrust of the wider spaced lower cutter disks, and consequently clean, non-burred strip edges are assured. It must be here pointed out that, from the standpoint of the above described material supporting function of the spacer bodies according to this invention, it is immaterial whether said bodies are of discontinuous or continuous annular form; it is therefore intended, with respect to this aspect of the invention, that both said forms of spacer bodies are comprehended, especially in view of the further fact that both continuous and discontinuous spacer bodies are known to the art. It will thus be obvious that the spacer bodies on the bottom cutter shaft 10 will support the work during the slitting operation, while the spacer bodies on the top cutter shaft 11 will serve to strip the work from the cutter disks. As a consequence of this, all necessity for use of separate work supporting fingers or blocks and of separate work stripping fingers or blocks is eliminated, since the spacer bodies 20 maintain adequate supporting and stripping contact with the work. Furthermore, since the spacer bodies 20 rotate under the drag of the sheet material undergoing the slitting operation, and since said spacer bodies are of relatively soft character, all risk of scratching or otherwise marring the work is likewise prevented.

Having now described our invention, we claim:

1. In a machine for slitting sheet or strip-like material, a pair of spaced cutter-carrying shafts, at least two cutter disks mounted on each of said shafts and spaced therealong, each cutter disk on each shaft being positioned to cooperate with a cutter disk on said other shaft, an annular resilient spacing member between adjacent cutter disks on each of said shafts, each of said spacing members having a greater outer diameter and a lesser inner opening conforming substantially to said shaft and being of a length substantially corresponding to the spacing between such cutter disks, and at least one rigid spacing element embedded in each of said spacing members in a position between said inner opening and said outer diameter and extending substantially from one face to the other face thereof, said shafts, in operation, being spaced so that the peripheries of opposing spacing members are substantially tangent to each other and radially yieldable to work passed therebetween.

2. In a machine for slitting sheet or strip-like material, a pair of spaced cutter-carrying shafts, at least two cutter disks mounted on each of said shafts and spaced therealong, each cutter disk on each shaft being positioned to cooperate with a cutter disk on said other shaft, an annular resilient spacing member between adjacent cutter disks on each of said shafts, each of said spacing members having an inner opening and on outer diameter substantially the same as the diameter of the cutter disks between which it is mounted and being of a length corresponding to the spacing between such cutter disks, a plurality of rigid spacing elements radially outwardly spaced from the annular opening and embedded in each of said spacing members and extending substantially from one axial face to the other axial face thereof, said shafts, in operation, being spaced so that the peripheries of the opposing spacing members are substantially tangent to each other and radially yieldable to work passed therebetween.

3. In a machine for slitting sheet or strip-like material according to claim 2, wherein each spacing member is split radially so that its meeting ends can be separated to pass transversely over a cutter shaft for operative mounting of such member between cutter disks mounted on said shaft.

4. A machine as recited in claim 2 wherein said spacing elements are substantially equally spaced from said outer diameter and said inner opening.

5. A spacing element for spacing apart adjacent cutter disks on a supporting shaft which comprises an annular body of resilient material having a centrally disposed opening therethrough corresponding in diameter to the diameter of said shaft and having an overall diameter substantially corresponding to the diameter of said cutter disks, and at least one rigid spacing element embedded in said member radially outwardly from said opening but inwardly from said overall diameter and extending substantially from one face to the other face thereof.

References Cited in the file of this patent

UNITED STATES PATENTS

| | | |
|---|---|---|
| 144,155 | Stephens | Oct. 28, 1873 |
| 448,258 | Ranney | Mar. 17, 1891 |
| 474,822 | Foote | May 17, 1892 |
| 529,831 | Peckham et al. | Nov. 27, 1894 |
| 672,899 | Haasch | Apr. 30, 1901 |
| 1,727,796 | Sumner | Sept. 10, 1929 |
| 1,955,944 | Carter | Apr. 24, 1934 |
| 2,210,018 | Yoder | Aug. 6, 1940 |
| 2,222,051 | Tyrrell | Nov. 19, 1940 |
| 2,241,395 | Egling | May 13, 1941 |
| 2,613,571 | Herman | Oct. 14, 1952 |